United States Patent

Rankin, Jr.

[11] 3,879,250
[45] Apr. 22, 1975

[54] METHOD OF MANUFACTURING PADDLE BALL RACQUETS

[76] Inventor: Paul B. Rankin, Jr., 1318 Skyridge Dr., Pittsburgh, Pa. 15241

[22] Filed: May 3, 1973

[21] Appl. No.: 356,711

[52] U.S. Cl.............. 156/228; 156/293; 161/68; 273/67 R
[51] Int. Cl............................................. A63b 59/04
[58] Field of Search .......... 156/212, 228, 321, 227, 156/79, 242, 285, 288, 267, 212, 293, 197; 161/68, 93; 273/73 F, 167 J, 75, 67 R; 264/321

[56] References Cited
UNITED STATES PATENTS

| | | | |
|---|---|---|---|
| 1,871,492 | 8/1932 | Brennecke | 156/228 |
| 2,140,692 | 12/1938 | Daly | 156/228 |
| 3,458,193 | 7/1969 | Rockwood et al. | 161/68 |
| 3,578,526 | 5/1971 | Harding | 156/228 |
| 3,600,257 | 8/1971 | Reinhardt | 161/68 |
| 3,753,843 | 8/1973 | Hutchinson | 161/68 |

Primary Examiner—Charles E. Van Horn
Assistant Examiner—Jerome W. Massie
Attorney, Agent, or Firm—Webb, Burden, Robinson & Webb

[57] ABSTRACT

A method of and apparatus for manufacture of paddle ball racquets having a pair of opposed striking surfaces sandwiching a core, preferably comprising a lightweight, high strength honeycomb-like network, and an edging strip which extends around the periphery of the racquet. The method involves assembling the elements of the sandwich construction in templates, placing the assembly in a forming apparatus and applying heat and pressure to the elements to bond them together. The apparatus comprises a press having a ram and a plurality of forming dies which are sequentially activated to form the edging strip and heated platens for adhesively bonding the striking surfaces to the edging strip and to the core.

4 Claims, 6 Drawing Figures

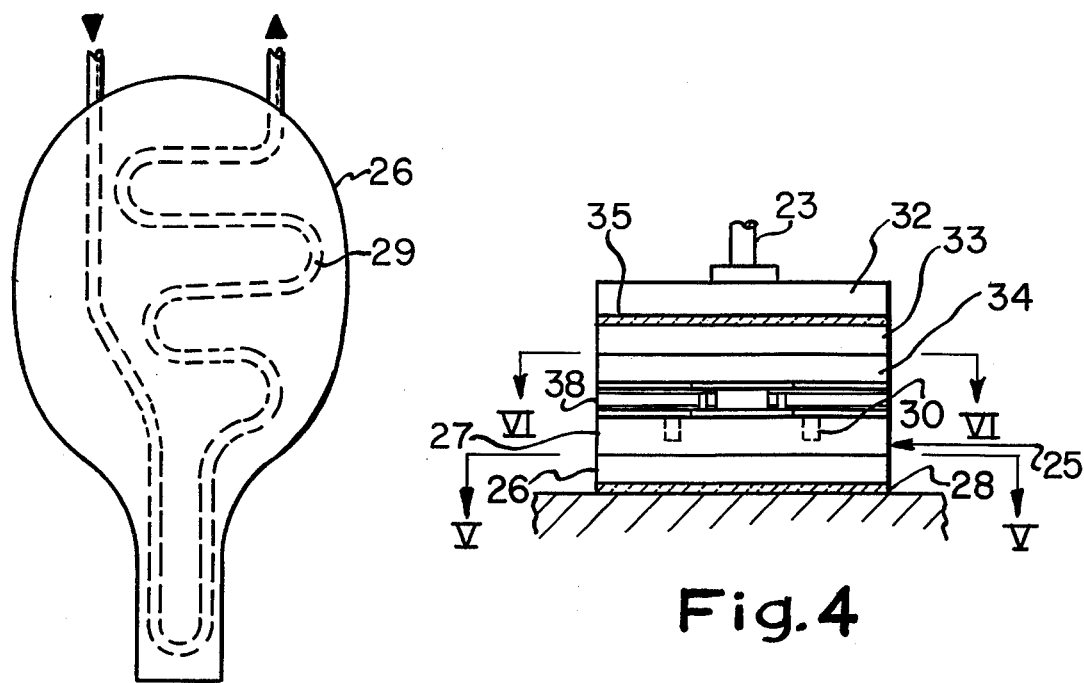
Fig. 4
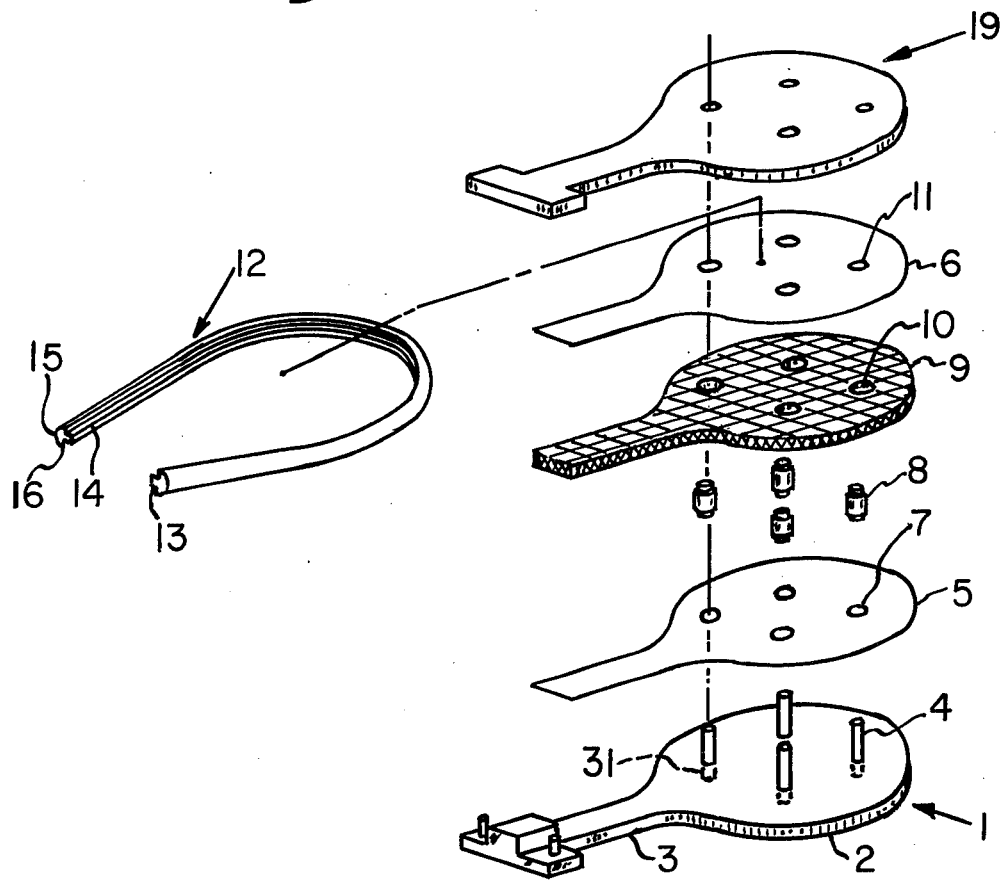
Fig. 5
Fig. 1

METHOD OF MANUFACTURING PADDLE BALL RACQUETS

This invention relates to paddle ball racquets and particularly to a method and apparatus for manufacturing such racquets. It is particularly suitable for manufacturing the improved racquet described and claimed in U.S. Patent application Ser. No. 292,990, filed Sept. 28, 1972 of James E. Danchulis and myself entitled "Improved Paddle Ball Racquet Construction," but is not limited thereto.

Heretofore, paddles and racquets have been constructed by making a frame and fabricating striking surfaces over the frame such as by bonding laminates or synthetics thereto under heat and pressure. Many types of core materials have been used; however, none has included a lightweight, high strength honeycomb-type network, for example of aluminum.

The method of the invention comprises assembling the racquet elements between a pair of interengaging templates, each having generally the form of a blade and handle configuration of the racquet to be made and having means for restricting movement of the edging strip of the racquet during assembly, placing the assembly in a forming apparatus, applying heat and pressure to the racquet elements to bond them together, and removing the racquet from the forming apparatus after the elements are adhesively bonded to each other. The racquet may be completed by a plastic, rubber or other suitable grip applied to the handle.

The apparatus comprises a press having a table. The press may be hydraulically or pneumatically operated. The assembled racquet elements are positioned between a pair of heated platens, one on the table and the other on a reciprocable ram vertically mounted over the table which is adapted to apply pressure to the assembly. A number of forming dies are located on the table and are actuated sequentially to engage the periphery of the assembly to form the racquet. The preferred capacity of the press is 750 psi or greater.

A complete understanding of the invention will be obtained from the following disclosure taken with the accompanying drawings wherein:

FIG. 1 is an exploded view showing the racquet elements between the templates;

FIG. 4 is an elevation view of the platens sandwiching the assembled racquet elements in the templates in the press;

FIG. 5 is a sectional view taken along lines V—V of FIG. 4; and

Figure 2:
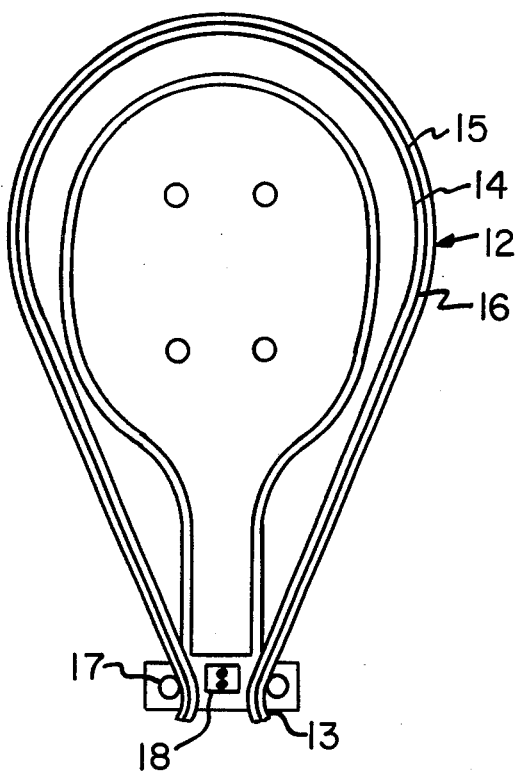
FIG. 2 is a plan view of the edging strip placed in position on a template.

Referring to FIG. 1, a preferred racquet is constructed by selecting a first template 1 having a blade portion 2 and a handle portion 3. A plurality of short studs 4 extend from the blade portion of the template.

Two thin plates or striking surfaces 5, 6 are prepared by coating one face of each with an adhesive coating such as epoxy resin, plastisol or the like. The striking surface 5, e.g. aluminum, is then placed on the template 1 with the studs 4 extending through the holes 7 in the striking surface. A cylindrical grommet 8 having a length approximately equal to the thickness of the completed racquet is placed over each stud. A core 9, for example a honeycomb-like network, having four openings 10 is then placed on the prepared surface 5, the studs passing through the openings 10. The second striking surface 6 is placed on the core. Holes 11 in the surface 6 correspond in location to the studs 4 in the template 1.

An edging strip 12, which is generally in the form of the blade portion and having ends 13 extending longer than the handle portion of the racquet is then placed around the striking surfaces separated by the core as shown in FIG. 2. The edging strip includes a body portion 14 and a cap portion 15 which preferably has a curved surface, such that a shoulder 16 is formed between the cap portion 15 and the body portion and the body portion fits between the edges of the striking surfaces around the core. When the edging strip is placed between the striking surfaces, the prepared faces of the striking surfaces engage the edges of the edging strip.

The template 1 also includes means on the end of the handle portion 3 for restricting movement of the edging strip during assembly and bonding of the racquet. The means comprise pins 17 which extend from handle portion 3 and prevent outward movement and a block 18 which prevents inward movement of the edging strip.

After the edging strip is properly in place, a second template 19 is positioned over the studs 4 and the assembly of racquet elements is ready for pressure bonding to complete the racquet.

It will be appreciated by those skilled in the art that the edging strip can be extended around the perimeter of the first striking surface and the network before the second striking surface is placed in position on the network with the prepared side of the second striking surface against the network and the edging strip.

Figure 3:
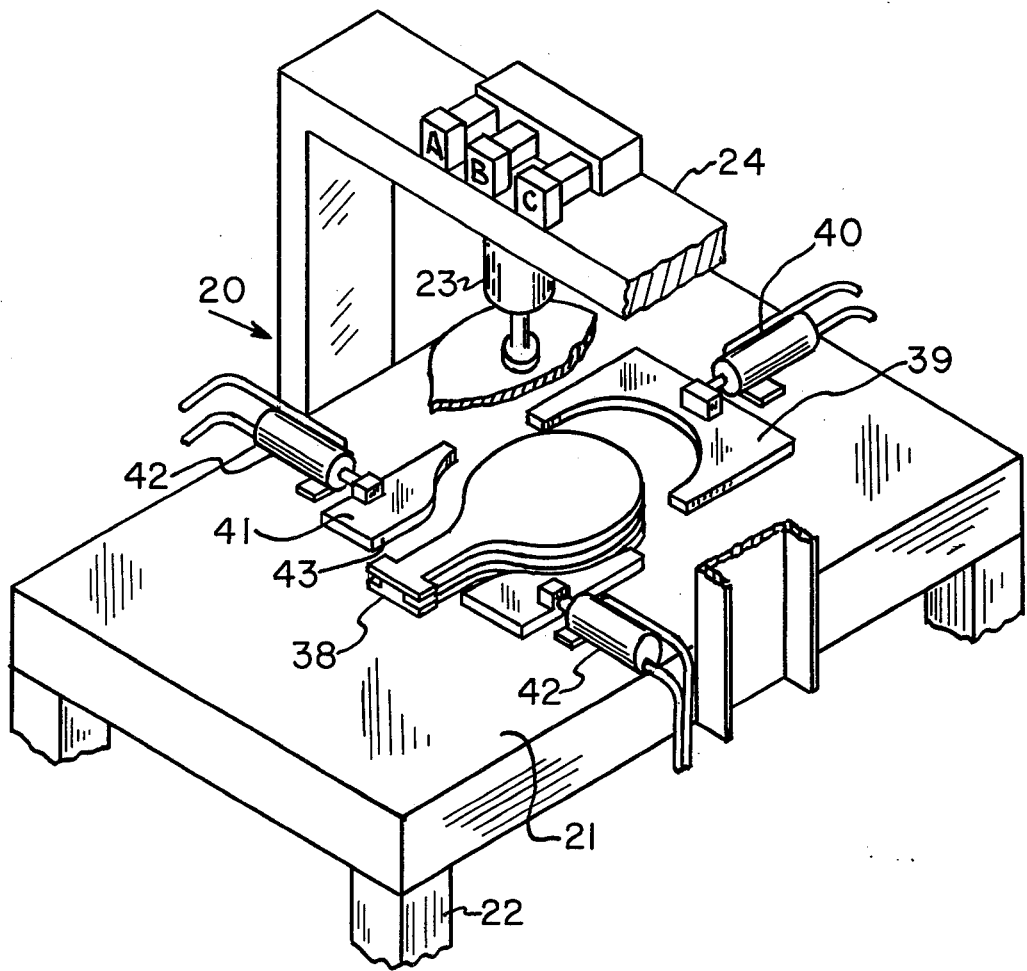
FIG. 3 is a partial perspective view of the press according to the invention.

As shown in FIGS. 3 and 4, preferred apparatus for bonding the assembly comprises an overhead ram press 20 having a table 21 supported by a plurality of legs 22. A piston-type ram 23 is mounted on a bridge 24 which spans the table. The preferred press is equipped with conventional hydraulic lines and controls for applying and releasing pressure to the assembly.

On the table below the ram there is a first platen 25 in the form of a paddle of substantially the same size as the template. As shown in FIG. 4, the platen comprises two thin metal plates 26, 27, for example of aluminum. An asbestos layer 28 is disposed between the table and the plate 26. A tubular coil 29 (FIG. 5) is disposed randomly in milled grooves in the plate 26 and is connected to suitable means for circulating cooling water through the coil. The top plate of the platen 25 includes four holes 30 into which ends 31 of studs 4 extend to properly locate the assembly of racquet elements in the press. A second platen comprising preferably a steel plate 32 and two aluminum plates 33, 34 is secured to the ram 23. There is a layer 35 of asbestos between the plates 32 and 33. A second tubular cooling coil similar to coil 29 is randomly oriented in grooves milled in the surface of the plate 34.

Figure 6:
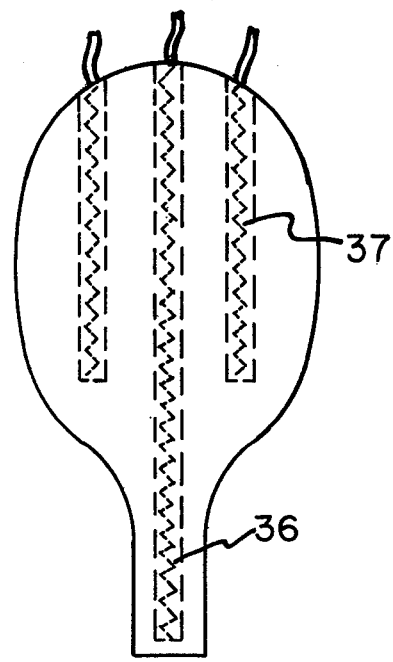
FIG. 6 is a sectional view taken along lines VI—VI of FIG. 4.

As shown in FIG. 6, the platens are provided with heating elements. There are preferably three such heating elements in each platen, for example one 1,200 watt element 36 and two 750 watt elements 37, which are electrically connected to a source of power (not shown). The elements may be cycled to bond the adhesive, the temperature depending upon the characteristics of the specific adhesive used. Of course, each platen may be a single plate appropriately machined for the heating elements and cooling means.

The assembly 38 comprising the racquet elements sandwiched between the templates is placed on the platen 25.

Referring again to FIG. 3, the preferred apparatus has a plurality of forming dies for seating and bonding the striking surfaces of the edging strip and to the core. A top forming die 39 is generally U-shaped and is actuated by a piston 40. When the die is actuated under pressure, it contacts the periphery of the edging strip and presses it tightly between the striking surfaces of the racquet to be made.

A forming die 41 is located on the table on each side of the platen 25. The dies are actuated by pistons 42 which extend substantially perpendicular to the length of the handle portion of the racquet assembly 38. The surfaces 43 of the dies are formed to correspond with the contour of the periphery of the racquet assembly extending along the blade portion 2 and the handle portion 3.

In order to properly seat the edging strip along the periphery of the racquet and to bond the assembly of the racquet elements together, the apparatus is sequentially operated. After the assembly 38 is positioned on the platen 25 on the table of the press, the vertical ram 23 is activated by control A to apply an initial pressure, e.g. approximately 50 psi, to the assembly to properly orient the elements of the racquet with respect to one another. The top forming die 39 is then activated by control B to firmly press the top periphery of the edging strip to seat the body portion 14 of the strip between the striking surfaces. After a brief time interval, for example about 3 seconds, the side forming dies 41 are activated to press the balance of the edging strip properly into position between the striking surfaces.

Substantial pressure, which may be in excess of about 750 psi, is then applied, using control C, through the ram to the assembly to firmly bond the striking surfaces to the edging strip and to the core.

This pressure is maintained for a time sufficient to effect a positive bond of the racquet elements. The time depends upon the type of adhesive used, the temperature of the platens and the pressure. I prefer to use 3M epoxy resin adhesives. One such resin requires 12 minutes curing time at about 350°F at 750 psi; another resin requires 30 seconds at 400°F and 750 psi.

After the required curing time has elapsed, the pressure is relieved, and the racquet assembly is removed from the platens and the racquet is separated from the templates. The ends of the edging strip may be trimmed flush with the end of the handle portion and a tubular grip of plastic, rubber or other suitable material may be slipped over the handle to complete the racquet.

Having described the preferred embodiments of my invention, it may be otherwise embodied within the scope of the appended claims.

I claim:

1. A method of making a paddle ball racquet having a handle portion and a blade portion including a pair of striking surfaces separated by a honeycomb-like core comprising:

A. preparing a side of each striking surface with a bonding material;
   B. placing a first striking surface in a template with the unprepared side of the striking surface adjacent the template;
   C. placing a honeycomb-like core on the prepared side of the first striking surface;
   D. placing a second striking surface on the core with the prepared side against the core;
   E. extending an edging strip around the perimeter of and between the striking surfaces;
   F. placing a second template on the second striking surface;
   G. applying an initial pressure to said surfaces and core
   H. sequentially applying pressure to said edging strip to form said strip around the periphery of each of the striking surfaces in contact with said surfaces; and
   I. applying a final pressure to and heating the striking surfaces, core and edging strip for a sufficient time and temperature to bond said surfaces to the edging strip and core.

2. A method of making a paddle ball racquet as set forth in claim 1 and including placing a plurality of grommets between said striking surfaces before applying any pressure to said surfaces.

3. A method of making a paddle ball racquet having a handle portion and a blade portion including a pair of striking surfaces separated by a honeycomb-like network which extends into the handle portion of the racquet comprising:

A. preparing one side of each striking surface with a bonding material;
   B. placing a first striking surface in a template with the unprepared side adjacent the template;
   C. placing the network on the first striking surface;
   D. extending an edging strip around the perimeter of the first striking surface;
   E. placing a second striking surface on the network with the prepared side against the network;
   F. placing a second template on said second striking surface;
   G. applying an inital pressure to said surfaces and network;
   H. sequentially applying pressure to said edging strip to form said strip around the periphery of said striking surfaces in contact with said surfaces;
   I. applying a final pressure to said striking surfaces, edging strip and network while heating the same for a sufficient time and temperature to cause said elements to bond; and
   J. completing said racquet by trimming said edging strip and applying a handle grip thereto.

4. A method as set forth in claim 3 wherein one of the templates includes studs extending from a face thereof for interengagement with holes in a face of the other template for aligning the templates, the striking surfaces and the network prior to applying pressure thereto.

* * * * *